Feb. 9, 1954 F. W. WAHLIN 2,668,624
STRAINER ATTACHMENT
Filed July 14, 1949
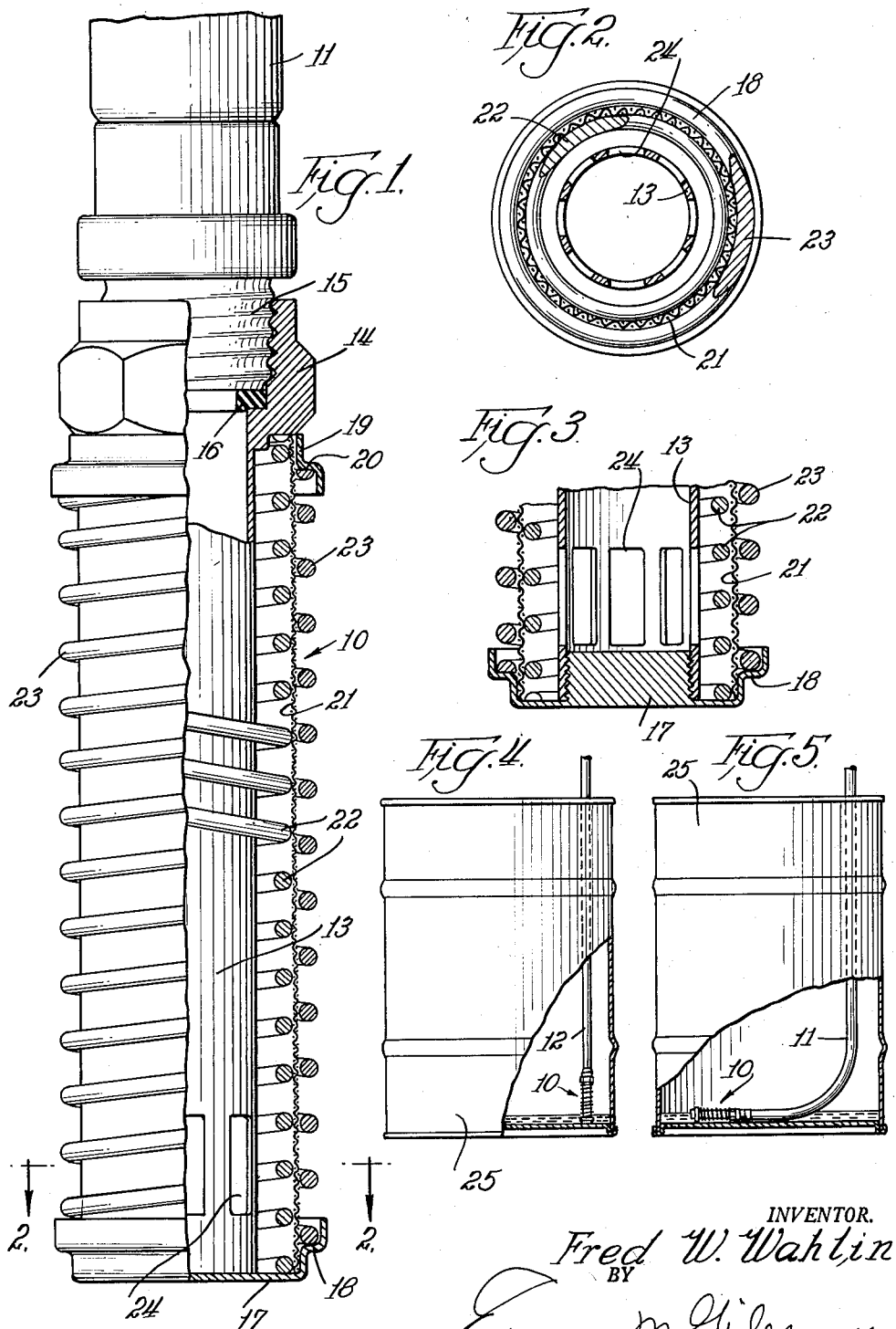
INVENTOR.
Fred W. Wahlin Patented Feb. 9, 1954

2,668,624

UNITED STATES PATENT OFFICE 2,668,624

STRAINER ATTACHMENT

Fred W. Wahlin, Oak Park, Ill., assignor to Spraying Systems Co., Bellwood, Ill., a corporation of Illinois Application July 14, 1949, Serial No. 104,671

2 Claims. (Cl. 210—170)

My invention relates to a straining or filtering attachment for pipes and hoses and has more particular reference to a strainer of this character which is small enough in size to be insertable through the bung-hole of an oil drum or the like and which has a large, reinforced straining area with an intake enclosed thereby and located near the base of the strainer.

This strainer attachment is adapted for use with hoses and pipes such as are used in removing liquids from oil drums, tanks, barrels, and the like. Liquids such as oil for example which have stood for some time in a drum or tank may contain sediment or other foreign matter which should be strained out as the liquid is removed.

Various types of strainers are available for this purpose but usually they have either a minimum of straining area which becomes clogged with sediment after brief use, thus necessitating frequent cleaning, or, if they have more straining area, their intakes are so high above the bottom of the tank or drum from which the liquid is to be extracted, that they do not remove the liquid near the bottom.

In order to overcome the limitations found in the usual strainer, I have invented a strainer attachment which provides an enlarged straining area and which at the same time has its intake at the lowest level within the strainer enclosure.

It is the object of my invention to design a straining attachment which will withdraw liquid substantially to the bottom of a barrel or drum; to provide a convenient strainer assembly from which the straining element may be readily removed and replaced; to retain such straining or filtering element in the desired shape by means of internal reinforcing; to provide external protection for said straining element to prevent dislocation or damage thereto; to supply convenient external means for scraping the outer surface of the straining element in order to remove foreign matter therefrom; and to provide simple, economical and convenient facilities which are readily attachable to the intake end of any ordinary pipe or hose; these and other objects being accomplished as hereinafter described, reference being had to the accompanying drawing in which Fig. 1 is a side view with portions broken away showing a strainer attachment embodying my invention, Fig. 2 is a sectional view on the line 2—2 of Fig. 1, Fig. 3 is a sectional view of Fig. 2, Fig. 4 is a side view of a liquid containing drum with a portion broken away to show my strainer attachment at the lower end of a pipe, and Fig. 5 is a view similar to Fig. 4 but showing my strainer invention attachment at the lower end of a flexible hose.

Referring now to the drawing, my strainer attachment is designated generally by the reference numeral 10 and may be attached either to a hose 11 as shown in Figs. 1 and 5 or to a pipe 12 as shown in Fig. 4. The strainer attachment 10 consists of a tubular core 13 with an attaching head 14 which is internally threaded for attachment to a standard hose fitting 15 or to the similarly threaded end of a length of pipe 12. The exterior of the attaching head 14 is hexagonal in shape for engagement by wrenches. The interior of the attaching head 14 is provided with a washer 16 of rubber or other suitable material which is seated at the upper end of the tubular core 13 and is engageable between the tubular core 13 and the hose fitting 15 to provide a leakproof assembly.

The opposite end of the tubular core 13 is internally threaded to receive the cap 17. The said cap 17 is provided with a peripheral seat 18, and an annular shell 19 supported on the attaching head 14 at the opposite end of the tubular core 13 is provided with a corresponding peripheral seat 20.

The straining element comprises a tubular screen 21 which is of substantially the same length as the tubular core 13 and is engaged endwise between the attaching head 14 and the cap 17. The tubular screen 21 is internally reinforced by a helical spring 22, the outer diameter of which is substantially the same as the inner diameter of the tubular screen 21 so that the latter will fit snugly over the said helical spring 22. The respective ends of the helical spring 22 are engaged in the same manner as the tubular screen 21, between the attaching head 14 and the cap 17.

The exterior of the tubular screen 21 is protected by a helical spring guard 23, the pitch of which is opposite to that of the helical spring 22. The inner diameter of the guard 23 is substantially the same as the outer diameter of the tubular screen 21, so that the said guard 23 will fit snugly over the tubular screen 21. The respective ends of the guard 23 are engaged by the respective peripheral seats 18 and 20. The respective ends may, however, be disengaged from the respective seats by grasping the spring guard 23 at either end and compressing said spring guard in the opposite direction. In this manner the convolutions of the spring guard 23 serve to scrap the outer surface of the tubular screen 21.

The tubular core 13 is provided with intake ports 24 at the lower end thereof, as shown in Fig. 1. Thus when the strainer attachment 10 is attached to a pipe 12, as shown in Fig. 4, the intake ports 24 are at the lower end of the strainer attachment so that in withdrawing fluid from a steel drum 25, for example, the liquid will continue to be withdrawn through the tubular core throughout most of the length of the strainer attachment 10 until the liquid level reaches the top of the intake ports 24. Moreover, to remove additional liquid, the drum 25 may be tilted so that the liquid accumulates around the strainer attachment 10, thus enabling removal of most of the liquid in said drum 25.

In a similar manner the strainer attachment 10 may be mounted at the end of a length of hose 11 and inserted into a similar steel drum 25 through the bung-hole thereof, and owing to the flexibility of the hose 11 the strainer attachment 10 may lie on the bottom of the said drum. In the same manner as heretofore described, liquid may be withdrawn from the steel drum until the liquid level is lowered to the level of the intake ports 24. Where a hose 11 is used for withdrawing the liquid, the drum 25 may be tilted so that the intake ports 24 will be submerged, permitting liquid withdrawal until substantially all of the liquid has been withdrawn.

If the liquid contains a substantial amount of sediment or other foreign matter, the tubular screen 21 may become clogged thereby. In this case the hose 11 or the pipe 12 may be withdrawn from the steel drum 25 and the spring guard 23 may be compressed in one direction and then the other to scrape the outer surface of the tubular screen 21 to remove the sediment or other foreign matter therefrom. The screen and the strainer attachment may then be reinserted into the drum 25 to continue the process of withdrawing the liquid contained therein.

When the tubular screen 21 becomes clogged with sediment or other foreign matter, there is a tendency for the screen to become collapsed, owing to the reduced pressure on the inner sides thereof, but the inner helical spring 22 provides reinforcement against such collapse.

The tubular screen 21 is protected against damage resulting from careless handling by the helical spring guard 23 surrounding the exterior of the tubular screen 21.

When it is desired to replace the straining element, the cap 17 is unscrewed from the end of the tubular core 13 thus permitting convenient removal of the tubular screen 21 and the helical springs 22 and 23. A new tubular screen 21 may then be slid over the inner helical spring 22 and the outer helical spring guard 23 may be engaged thereon and the said tubular screen and spring assembly may then be mounted on the tubular core 13 and secured in position by screwing the cap 17 into place at the end thereof. It will be understood, of course, that the tubular screen 21 will be of any desired mesh in order to strain or filter out sediment or other foreign matter of a pre-determined size.

While I have shown and described my invention in a preferred form, I am aware that various changes or modifications may be made therein without departing from the principles of my invention, the scope of which is to be determined by the appended claims.

What is claimed is:

1. A strainer head comprising an elongated tubular screen and an elongated screen holder extending lengthwise within the screen and having opposed annular seats in which the opposite ends of the screen are secured, said holder having at one end thereof a screen closing member which closes one end of the screen and said holder having an opening leading therefrom at the other end of the screen and communicating with the interior of the screen, an open coil screen cleaning spring surrounding and extending from end to end of the screen and having the convolutions thereof spaced apart and each freely slidable lengthwise of the screen along the outer surface thereof in scraping engagement therewith, said spring being exposed and free to be grasped manually for reciprocation lengthwise of the screen, and abutments at the opposite ends of the screen and against which the opposite ends of the spring abut to confine the spring endwise at the location of the screen, the spring ends being freely retractable along the screen from their respective abutments, and an elongated open coil spring within and internally supporting the screen throughout the length of the latter, the pitch of said internally supporting spring being opposite to that of the aforesaid screen surrounding spring.

2. A strainer head comprising an elongated cylindrical screen, and a screen holder having an elongated tubular extension within and spaced from the screen and extending lengthwise thereof, said extension being open at one end and provided around that end with an annular seat in which one end of the screen is secured, and a cap detachably secured to and closing the other end of said extension and having an annular seat therearound in which the other end of the screen is secured, an open coil screen cleaning spring surrounding and extending from end to end of the screen and having the convolutions thereof spaced apart and each freely slidable lengthwise of the screen along the outer surface thereof in scraping engagement therewith, said spring being exposed and free to be grasped manually for reciprocation lengthwise of the screen, and abutments at the opposite ends of the screen and against which the opposite ends of the spring abut to confine the spring endwise at the location of the screen, the spring ends being freely retractable along the screen from their respective abutments, and an elongated open coil spring within and internally supporting the screen throughout the length of the latter, the pitch of said internally supporting spring being opposite to that of the aforesaid screen surrounding spring, said screen and tubular extension having an annular chamber therebetween which extends lengthwise thereof, said extension having at the closed end thereof openings through the wall thereof through which said annular chamber is exclusively communicable with the interior of the extension.

FRED W. WAHLIN.

References Cited in the file of this patent

UNITED STATES PATENTS

| Number | Name | Date |
|---|---|---|
| 217,126 | Loudon | July 1, 1879 |
| 231,066 | Long | Aug. 10, 1880 |
| 679,131 | Thompson | July 23, 1901 |
| 900,104 | Kessler | Oct. 6, 1908 |
| 1,090,387 | Davidson | Mar. 17, 1914 |
| 1,116,234 | Brown | Nov. 3, 1914 |
| 1,928,049 | Danills | Sept. 26, 1933 |
| 2,186,440 | Williams | Jan. 9, 1940 |

FOREIGN PATENTS

| Number | Country | Date |
|---|---|---|
| 8,808 | Great Britain | Apr. 18, 1903 |
| 169,591 | Great Britain | Oct. 6, 1921 |
| 658,237 | France | of 1929 |
| 759,090 | France | Nov. 16, 1933 |